(12) United States Patent
Srinivas et al.

(10) Patent No.: US 12,149,294 B2
(45) Date of Patent: Nov. 19, 2024

(54) HYBRID IN-SITU AND SIGNAL OF OPPORTUNITY CALIBRATION FOR ANTENNA ARRAYS

(71) Applicants: Sharanya Srinivas, Tempe, AZ (US); Daniel W. Bliss, Phoenix, AZ (US)

(72) Inventors: Sharanya Srinivas, Tempe, AZ (US); Daniel W. Bliss, Phoenix, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 360 days.

(21) Appl. No.: 17/589,297

(22) Filed: Jan. 31, 2022

(65) Prior Publication Data

US 2022/0247501 A1  Aug. 4, 2022

Related U.S. Application Data

(60) Provisional application No. 63/143,100, filed on Jan. 29, 2021.

(51) Int. Cl.
*H04B 17/12* (2015.01)
*H01Q 3/30* (2006.01)
(Continued)

(52) U.S. Cl.
CPC ............ *H04B 17/12* (2015.01); *H01Q 3/30* (2013.01); *H04B 7/0617* (2013.01); *H04B 7/18513* (2013.01)

(58) Field of Classification Search
CPC .. H04B 17/12; H04B 7/0617; H04B 7/18513; H01Q 3/30
See application file for complete search history.

(56) References Cited

U.S. PATENT DOCUMENTS 7,418,343 B1 * 8/2008 McGraw ............... G01S 3/36
244/76 R
9,705,611 B1 * 7/2017 West ..................... H01Q 3/267
(Continued)

OTHER PUBLICATIONS

Haupt, R., "Antenna Arrays: A Computational Approach," Sep. 2010, Wiley-IEEE Press, 552 pages.
(Continued)

*Primary Examiner* — Junpeng Chen
(74) *Attorney, Agent, or Firm* — Withrow & Terranova, P.L.L.C.

(57) ABSTRACT

Hybrid in-situ and signal of opportunity (SoOP) calibration for antenna arrays is provided. Deployment of aircraft antennae is redesigned to support multiple services with shared physical elements that conform to the exterior of an aircraft to mitigate drag. Conformal arrays are, however, susceptible to structural changes in the fuselage that manifest as pointing errors and side lobe degradation. Embodiments provide an online calibration algorithm that leverages cooperative satellites in direct line-of-sight of a radio frequency (RF) device with an antenna array (e.g., an aircraft with a conformal antenna array) to optimally steer beams. These external calibration sources supplement an in-situ source mounted on a common platform with the antenna array (e.g., placed on the aircraft's tail). Models are established for potential sources of mismatch and the hybrid calibration method is demonstrated via simulations.

20 Claims, 9 Drawing Sheets

(51) Int. Cl.
*H04B 7/06* (2006.01)
*H04B 7/185* (2006.01)

(56) References Cited

U.S. PATENT DOCUMENTS

| | | | | |
|---|---|---|---|---|
| 11,322,837 B2* | 5/2022 | Tiebout | ............... | H01Q 21/24 |
| 2010/0093282 A1* | 4/2010 | Martikkala | ............ | H04B 17/21 |
| | | | | 455/63.4 |
| 2012/0009942 A1* | 1/2012 | Zoubir | ............... | H04B 7/086 |
| | | | | 455/226.1 |
| 2022/0128654 A1* | 4/2022 | Rosu | ............... | G01S 7/4021 |
| 2023/0341497 A1* | 10/2023 | Clymer | ............... | G01S 3/48 |

OTHER PUBLICATIONS

Herschfelt, A. et al., "Joint Positioning-Communications System Design and Experimental Demonstration," 2019 IEEE/AIAA 38th Digital Avionics Systems Conference (DASC), Sep. 8-12, 2019, San Diego, CA, USA, IEEE, 6 pages.

Josefsson, L. et al., "Conformal Array Antenna Theory and Design," 2006, Wiley-IEEE Press, 488 pages.

Monzingo, R. et al., "Introduction to Adaptive Arrays," 2004, Scitech Publishing, 551 pages.

Rockah, Y. et al., "Array shape calibration using sources in unknown locations—Part I: Far-field sources," IEEE Transactions on Acoustics, Speech, and Signal Processing, vol. 35, No. 3, Mar. 1987, IEEE, pp. 286-299.

Silverstein, S.D., "Application of orthogonal codes to the calibration of active phased array antennas for communication satellites," IEEE Transactions on Signal Processing, vol. 45, No. 1, Jan. 1997, IEEE, pp. 206-218.

Smith, J.J. et al., "The Cramer-Rao lower bound for towed array shape estimation with a single source," IEEE Transactions on Signal Processing, vol. 44, Issue 4, Apr. 1996, IEEE, pp. 1033-1036.

Srinivas, S. et al., "Joint Positioning-Communications System : Optimal Distributed Coherence and Positioning Estimators," 2019 53rd Asilomar Conference on Signals, Systems, and Computers, Nov. 3-6, 2019, Pacific Grove, CA, USA, IEEE, 5 pages.

Srinivas, S. et al., "Conformal Multi-Service Antenna Arrays: Hybrid In Situ & Signal of Opportunity (SoOP) Calibration," 2020 IEEE 92nd Vehicular Technology Conference (VTC2020—Fall), Nov. 18-Dec. 16, 2020, Victoria, BC, Canada, IEEE, 5 pages.

Tyler, N. et al., "Adaptive antennas: the calibration problem," IEEE Communications Magazine, vol. 42, No. 12, Dec. 2004, IEEE, pp. 114-122.

* cited by examiner

HYBRID IN-SITU AND SIGNAL OF OPPORTUNITY CALIBRATION FOR ANTENNA ARRAYS

RELATED APPLICATIONS

This application claims the benefit of provisional patent application Ser. No. 63/143,100, filed Jan. 29, 2021, the disclosure of which is hereby incorporated herein by reference in its entirety.

FIELD OF THE DISCLOSURE

The present disclosure relates to multi-antenna arrays and calibration thereof.

BACKGROUND

Modern day aircrafts rely on a plethora of communications and navigation systems to enable secure and reliable flight operations. These systems are designed in isolation and physically separated to prevent interference between services. These choices lead to stove-pipe designs that lack backward compatibility. As a direct consequence, exteriors of aircrafts are studded with more than thirty antennae protruding from their bodies, which disturb the laminar air flow along the aircraft's skin. The additional drag created by the antennae increases fuel consumption and, therefore, operational expenses. In addition, installing each antenna is mechanically nontrivial and individual connections and dedicated processing chains are expensive.

SUMMARY

Hybrid in-situ and signal of opportunity (SoOP) calibration for antenna arrays is provided. Current day commercial aircrafts are equipped with numerous communications and navigation systems that are considered in isolation, leading to a stove-pipe design. Antennae supporting these services protrude from the aircraft's body, increasing drag and, as a result, fuel consumption. Therefore, deployment of the antennae is redesigned to support multiple services with shared physical elements that conform to the exterior of an aircraft to mitigate drag. Conformal arrays are, however, susceptible to structural changes in the fuselage that manifest as pointing errors and side lobe degradation.

Embodiments provide an online calibration algorithm that leverages cooperative satellites in direct line-of-sight of a radio frequency (RF) device with an antenna array (e.g., an aircraft with a conformal antenna array) to optimally steer beams. These external calibration sources supplement an in-situ source mounted on a common platform with the antenna array (e.g., placed on the aircraft's tail). Models are established for potential sources of mismatch and the hybrid calibration method is demonstrated via simulations.

An exemplary embodiment provides a method for calibration of an antenna array. The method includes receiving calibration signals from each of an in-situ RF source and one or more remote RF sources. The method further includes estimating a direction of arrival for each of the in-situ RF source and the one or more remote RF sources to produce a set of estimated directions of arrival. The method further includes comparing the set of estimated directions of arrival with a corresponding set of known directions of arrival to calibrate the antenna array.

Another exemplary embodiment provides an RF device. The RF device includes an antenna array and a processing device coupled to the antenna array. The processing device is configured to receive a first calibration signal from an in-situ RF source, produce a first estimated direction of arrival of the first calibration signal, receive a second calibration signal from a remote RF source, produce a second estimated direction of arrival of the second calibration signal, and calibrate the antenna array using the first estimated direction of arrival and the second estimated direction of arrival.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
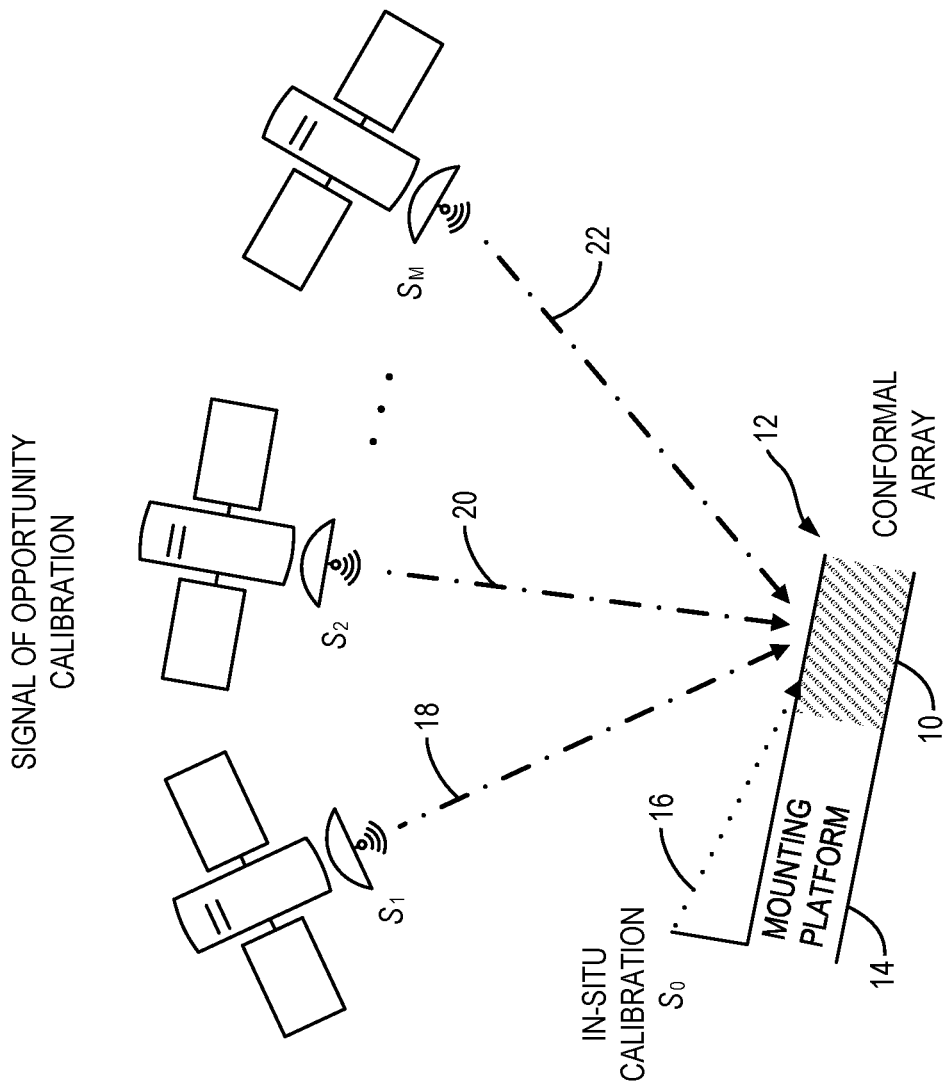
FIG. 1 is a schematic diagram of a hybrid in-situ and signal of opportunity (SoOP) calibration method used by embodiments herein for a conformal multi-service antenna array.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Hybrid in-situ and signal of opportunity (SoOP) calibration for antenna arrays is provided. Current day commercial aircrafts are equipped with numerous communications and navigation systems that are considered in isolation, leading to a stove-pipe design. Antennae supporting these services protrude from the aircraft's body, increasing drag and, as a result, fuel consumption. Therefore, deployment of the antennae is redesigned to support multiple services with shared physical elements that conform to the exterior of an aircraft to mitigate drag. Conformal arrays are, however, susceptible to structural changes in the fuselage that manifest as pointing errors and side lobe degradation.

Embodiments provide an online calibration algorithm that leverages cooperative satellites in direct line-of-sight (LOS) of a radio frequency (RF) device with an antenna array (e.g., an aircraft with a conformal antenna array) to optimally steer beams. These external calibration sources supplement an in-situ source mounted on a common platform with the antenna array (e.g., placed on the aircraft's tail). Models are established for potential sources of mismatch and the hybrid calibration method is demonstrated via simulations.

I. Introduction

To address complexity issues with traditional aircraft antennae, embodiments described herein use multi-service antenna arrays with synergistic sharing of physical elements such as cabling, power supplies, clock oscillators and other supporting infrastructure. Such an array also minimizes drag because it conforms to the hull of the aircraft.

Conforming to the exterior of an aircraft, the array's geometry is prone to fluctuations due to slight structural changes in the fuselage. During flight, modifications in internal pressure, external temperature and aging of the material warp and deform the surface of an aircraft. Such deformations cause pointing errors, side-lobe degradation, undesirable frequency selectivity, reduced power in the direction of interest and in general, reduction in antenna performance. Consequently, conformal arrays need to be calibrated on-line and in real time to ensure secure communications.

FIG. 1 is a schematic diagram of a hybrid in-situ and SoOP calibration method used by embodiments herein for a conformal multi-service antenna array 10. The calibration method can be used by an RF device 12, which includes the multi-service antenna array 10 mounted to a mounting platform 14. An in-situ RF source $S_0$ is also mounted to the mounting platform 14 and may be coupled to or form part of the RF device 12. The hybrid calibration technique of embodiments described herein uses signals 16, 18, 20, 22 from the in-situ RF source $S_0$ and one or more remote RF sources $S_1, S_2, \ldots, S_m$ to calibrate the multi-service antenna array 10.

This hybrid technique utilizes mismatch models to assess and correct phase errors arising from time-dependent variations in antenna array geometry. Some embodiments rely on availability of satellites in direct LOS of the aircraft and knowledge of their precise position in space to facilitate this novel calibration algorithm. This is a reasonable assumption since such specifics are public domain knowledge. Workings of the novel technique are described below, and its capabilities are demonstrated via simulations for planar conformal arrays.

A. Calibration Issues in Conformal Arrays

Manufacturing processes, construction of the array, and tolerances in materials are a few sources of mismatches in phased antenna arrays. These errors could either be systemic—static and fairly constant throughout the lifetime of the antenna elements, or statistical—dynamic and varying due to operating temperature, frequency and aging. The systemic inaccuracies can be tuned off-line as a post-construction process.

Conforming to the hull of an aircraft's fuselage makes the array susceptible to surface deformations in addition to other operating factors causing statistical errors to be dynamic and correlated. These inaccuracies manifest as frequency dependence, spatial selectivity, pointing errors, side-lobe degradation, loss of directivity, and an overall degeneration of antenna performance. Therefore, a phased array needs to be calibrated in order to generate optimum coherent beams.

Over the past several decades, numerous techniques have been proposed to attain near- and far-field calibration. Embodiments described herein opt for a source-based on-line calibration of phased arrays. This method is realized by employing external far-field sources whose locations are known to reasonable certainty that radiate a known signal waveform which can be leveraged to calibrate the array.

B. Problem Setup

With reference to FIG. 1, a source with known location radiates a known calibration signal to all elements in the conformal multi-service antenna array 10. At regular intervals, the main beam of the antenna array 10 is steered towards the source, to generate optimal coherent beams. To enable recalibration while airborne, the in-situ source $S_0$ is located on the aircraft (e.g., at the tail). Placement at the tail can ensures that fluctuations in $S_0$ are independent of structural changes to the fuselage, and hence deformations in the antenna array 10.

However, a single source is insufficient to assess and correct for the effects of dynamic correlated errors. This is due to the fact that the problem at hand is underdetermined, as shall be evident when formulating calibration as an optimization algorithm. Adding more sources to the surface of the aircraft for calibration is ill-advised because they would add drag, the very issue this disclosure intends to circumvent. Also, such sources do not provide sufficient dilution of precision (DoP) and are at a higher risk of coupling into surface changes in the fuselage, making it impossible to disentangle errors in the antenna array 10. Therefore, opportunity-based sources are used to supplement $S_0$, such as by leveraging satellites or other remote sources $\{S_1, S_2, \ldots, S_m\}$ in direct LOS of the aircraft. This hybrid approach is enabled by public knowledge of satellite positions in space, as well as precise self-localization capabilities of the aircraft, which can be used to estimate the direction of arrival of the calibration signals 16, 18, 20, 22. Aircraft are generally equipped with on-board localization systems (e.g., global positioning system (GPS), very high frequency omni-directional range (VOR), etc.), which can be supplemented by subscribing to a joint positioning-communications system.

II. Beam Steering

Beam steering ensures signals emitted from or received at an array interfere constructively in a direction of interest while interfering destructively elsewhere. Spatial selectivity is achieved by manipulating amplitude and phase of the signal at each antenna element of the antenna array.

Figure 2:
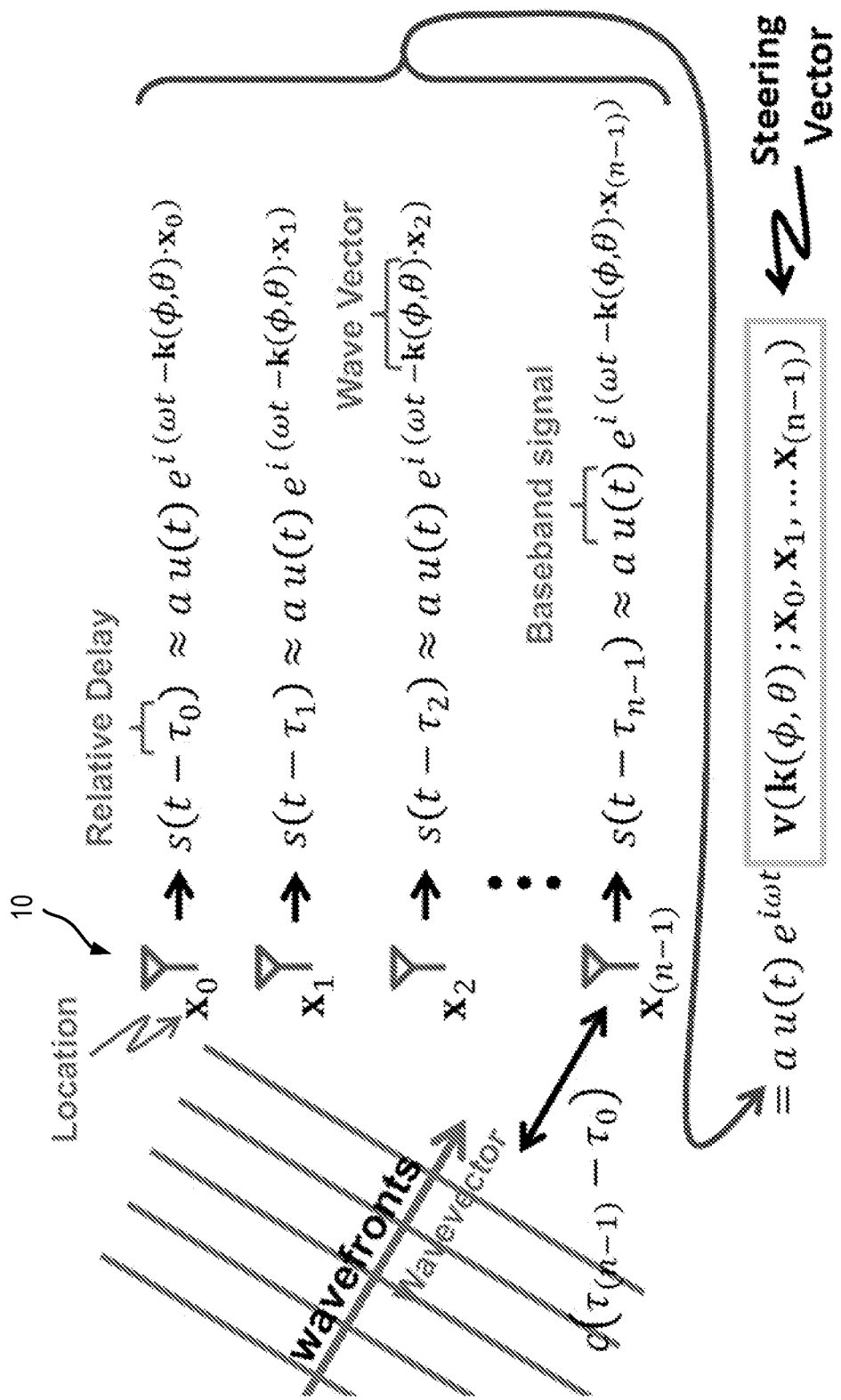
FIG. 2 is a schematic diagram of a signal arriving at antenna elements of the multi-service antenna array.

FIG. 2 is a schematic diagram of a signal arriving at antenna elements of the multi-service antenna array 10 of FIG. 1. Consider a signal s(t) arriving at an N element planar array, whose antennae are located at $x_n$ where $n \in \{0,1, \ldots, (N-1)\}$. The reception at the nth antenna located at $x_n$ is, $$s(t-\tau_n) = aU(t)e^{i(\omega t - k(\phi,\theta) \cdot x_n)} \qquad \text{Equation 1}$$

where $\tau_n$ is the relative time delay in arrival, a is the signal amplitude, u(t) is the baseband signal, $\omega$ is the carrier frequency, and (·) represents a dot product operation. The wave vector $k(\phi, \theta)$ describes the phase progression of a plane wave at any azimuth $\phi$ and elevation $\theta$ angles, in three-dimensional space, $$k(\phi, \theta) = \frac{2\pi}{\lambda}[\sin\theta\cos\phi, \sin\theta\sin\phi, \cos\theta] \qquad \text{Equation 2}$$

where $\lambda = c/f$ is the wavelength, f is the operating frequency, c is the speed of light and $$k = \left(\frac{2\pi}{\lambda}\right)$$

is the wavenumber. The received signal $s(t-\tau)$ is re-imagined as, $$s(t-\tau) = au(t)e^{i(\omega t)}v(k(\phi,\theta); x) \qquad \text{Equation 3}$$

for $x = \{x_0, x_1, \ldots, x_{n-1}\}$ and $\tau = \{\tau_1, \tau_2, \ldots, \tau_n\}$ and $v(\cdot)$ is the steering vector, $$v(k(\phi, \theta); x) = \begin{pmatrix} e^{i(k(\phi,\theta) \cdot x_0)} \\ e^{i(k(\phi,\theta) \cdot x_1)} \\ \vdots \\ e^{i(k(\phi,\theta) \cdot x_{(N-1)})} \end{pmatrix} \qquad \text{Equation 4}$$

Directivity of this array, portrayed in FIG. 2, is assessed via beam pattern, $$\|E(\alpha, \gamma)\|^2 = \frac{\|v(k(\phi, \theta); x)^\dagger v(k(\alpha, \gamma); x)\|_2^2}{\|v(k(\phi, \theta); x)^\dagger v(k(\phi, \theta); x)\|_2^2} \qquad \text{Equation 5}$$

measured as normalized power in decibels (dB), along azimuth and elevation scan angles $0 \leq \alpha \leq 2\pi$ and $$-\frac{\pi}{2} \leq \gamma \leq \frac{\pi}{2},$$

respectively.

III. Potential Sources of Mismatch

Figure 3C:
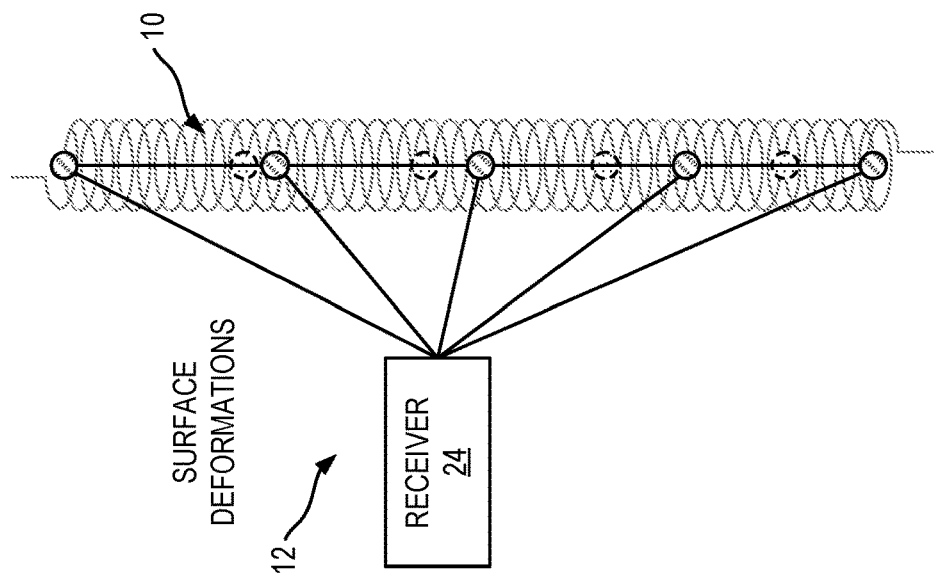
FIG. 3C is a schematic diagram of another potential source of error in the multi-service antenna array, surface deformations due to warping of the platform.
Figure 3B:
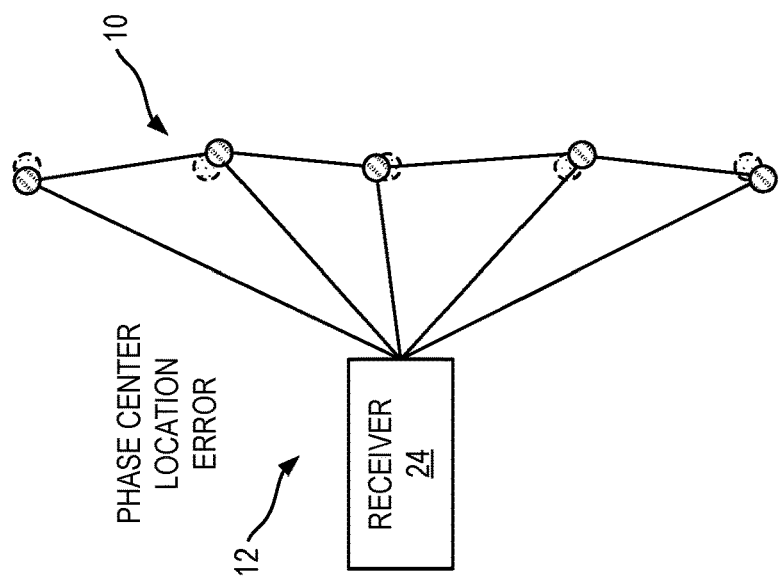
FIG. 3B is a schematic diagram of another potential source of error in the multi-service antenna array, a phase center location error due to manufacturing processes.
Figure 3A:
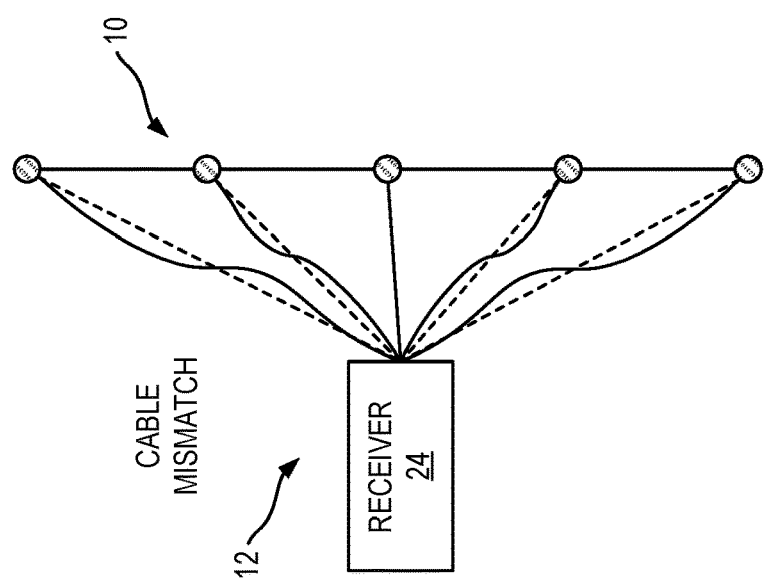
FIG. 3A is a schematic diagram of a potential source of error in the multi-service antenna array, a cable length mismatch due to temperature dependency and aging.

With reference to FIGS. 3A-3C, potential sources of mismatch errors in antenna arrays are identified that impact their far-field behavior. These potential sources of mismatch errors and related mathematical quantification are described below.

A. Cable Length Mismatch and Phase Center Location Error

Tolerances in manufacturing processes and array construction result in random errors that manifest as amplitude and phase distortions in the beam-formed signal. Constant fluctuations in the operating temperature, caused by changes in flying altitude of an aircraft, result in loss of elasticity in the materials introducing random but temperature-dependent mismatches in cable lengths and phase center location.

FIG. 3A is a schematic diagram of a potential source of error in the multi-service antenna array 10, a cable length mismatch due to temperature dependency and aging. Each antenna in the antenna array 10 is coupled to a receiver 24 of the RF device 12 by cables which may vary in length over time due to environmental effects, such as temperature, pressure, and aging. Cable length imperfections, indicated by $\delta_n \forall n \in \{0,1,\ldots,(N-1)\}$, affect the steering vector as follows.

$$\tilde{v}_c(k(\phi,\theta);x) = \begin{pmatrix} e^{ik(\phi,\theta)\cdot(x_0+\delta_0)} \\ e^{ik(\phi,\theta)\cdot(x_1+\delta_1)} \\ \vdots \\ e^{ik(\phi,\theta)\cdot(x_{N-1}+\delta_{N-1})} \end{pmatrix} \quad \text{Equation 6}$$

FIG. 3B is a schematic diagram of another potential source of error in the multi-service antenna array 10, a phase center location error due to manufacturing processes. The steering vector when accounting for random phase center location errors $\eta$ is given by $$\tilde{v}_p(k(\phi,\theta);x) = \begin{pmatrix} e^{ik(\phi,\theta)\cdot(x_0+\eta_0)} \\ e^{ik(\phi,\theta)\cdot(x_1+\eta_1)} \\ \vdots \\ e^{ik(\phi,\theta)\cdot(x_{N-1}+\eta_{N-1})} \end{pmatrix} \quad \text{Equation 7}$$

These two phase distortions are quantified by $k(\phi,\theta)\cdot\delta_n$ and $k(\phi,\theta)\cdot\eta_n$. Such errors can be accounted for off-line because they are static. They are, however, frequency and temperature dependent and off-line calibration can account for such dependencies. It is assumed that as a post-production measure, an estimate of these errors for a variety of operating conditions was made and provided to the users as hardware specifications. These estimates, appropriately, act as initial approximations for solving the optimization problem, explained further in Section V, that enables the hybrid in-situ and SoOP calibration method.

B. Surface Deformations

Conformal arrays are prone to structural changes with deformations in the mounting platform and/or a common substrate of the conformal array. Fluctuating temperature and pressure during flight cause the surface of the fuselage to warp and buckle. Constant stress to the material contributes to aging, which in turn induces surface imperfections $\Delta$.

FIG. 3C is a schematic diagram of another potential source of error in the multi-service antenna array 10, surface deformations due to warping of the platform. Unlike previously mentioned sources of mismatch, elasticity in the material introduces correlated errors, presented in the figure metaphorically as a spring. Prior work in this field fails to consider warping of realistic materials and hence ignores presence of correlated errors. All surface distortions are indicated as either expansions or compression of these "springs". Such errors also produce phase distortions, indicated here with a steering vector equation as follows, where $\tilde{x}_n = x_n + \Delta_n$ is the location of the $n^{th}$ antenna element on the deformed surface.

$$\tilde{v}_s(k(\phi,\theta);x) = \begin{pmatrix} e^{ik(\phi,\theta)\cdot\tilde{x}_0} \\ e^{ik(\phi,\theta)\cdot\tilde{x}_1} \\ \vdots \\ e^{ik(\phi,\theta)\cdot\tilde{x}_{N-1}} \end{pmatrix} \quad \text{Equation 8}$$

These imperfections are factored in alongside other mismatch errors in the model and jointly estimated during on-line calibration. Since $\Delta$ couples into the non-linear platform deformations, sufficient independent external sources that satisfy mismatch modality are necessary to estimate these correlated errors.

C. Effects of Phase Mismatch

An aggregate impact of these sources of mismatch is $$\tilde{V}(k(\phi,\theta);x) = D_c D_p D_s v(k(\phi,\theta);x) \quad \text{Equation 9}$$

where error matrices $D_c$, $D_p$ and $D_s$ are $$D_c = \text{diag}(e^{ik(\phi,\theta)\cdot\delta_0},\ldots,e^{ik(\phi,\theta)\cdot\delta_{(N-1)}}) \quad \text{Equation 10}$$

$$D_p = \text{diag}(e^{ik(\phi,\theta)\cdot\eta_0},\ldots,e^{ik(\phi,\theta)\cdot\eta_{(N-1)}}) \quad \text{Equation 11}$$

$$D_s = \text{diag}(e^{ik(\phi,\theta)\cdot\Delta_0},\ldots,e^{ik(\phi,\theta)\cdot\Delta_{(N-1)}}) \quad \text{Equation 12}$$

respectively, where $\text{diag}(\cdot)$ is diagonal operator.

The cable length mismatch $\delta$ and phase center location error $\eta$ present as random phase errors and cannot be distinguished from each other. Therefore, a net random phase distortion can be defined as $\in = (\delta+\eta)$. Whereas, the surface deformations introduce correlated errors $\Delta$. Hence, the parameters of interest for which compensation is needed are $\beta = \{\in = (\delta+\eta), \Delta\}$. These phase distortions cause pointing errors, side-lobe degradation, undesirable frequency selectivity, reduced power in the direction of interest, and other performance depletion.

IV. Hybrid In-Situ and SoOP Calibration

Here, a hybrid on-line calibration method is described which tunes the far-field behavior of a conformal array using external sources. Specifics of the calibration algorithm and necessary implementation details are described in greater detail.

A. Calibration Algorithm

Consider $(M+1)$ sources, comprised of one in-situ $S_0$ and $M$ cooperative satellites $S_m$, $m \in \{1, 2, \ldots, M\}$, broadcast calibration signals $s_m(t)$ from known directions of arrival $(\phi_m, \theta_m)$ to an array of size $N$. At predetermined intervals, the conformal array estimates direction of arrival $(\hat{\phi}_m, \hat{\theta}_m)$ by digitally steering the main beam towards each of the sources. The estimated steering vector to the $m^{th}$ source $S_m$ is $\hat{V}(k(\hat{\phi}_m, \hat{\theta}_m); x)$ where $(\hat{\phi}_m, \hat{\theta}_m)$ are the estimated azimuth and elevation with ideal antennae positions $x$.

Figure 4:
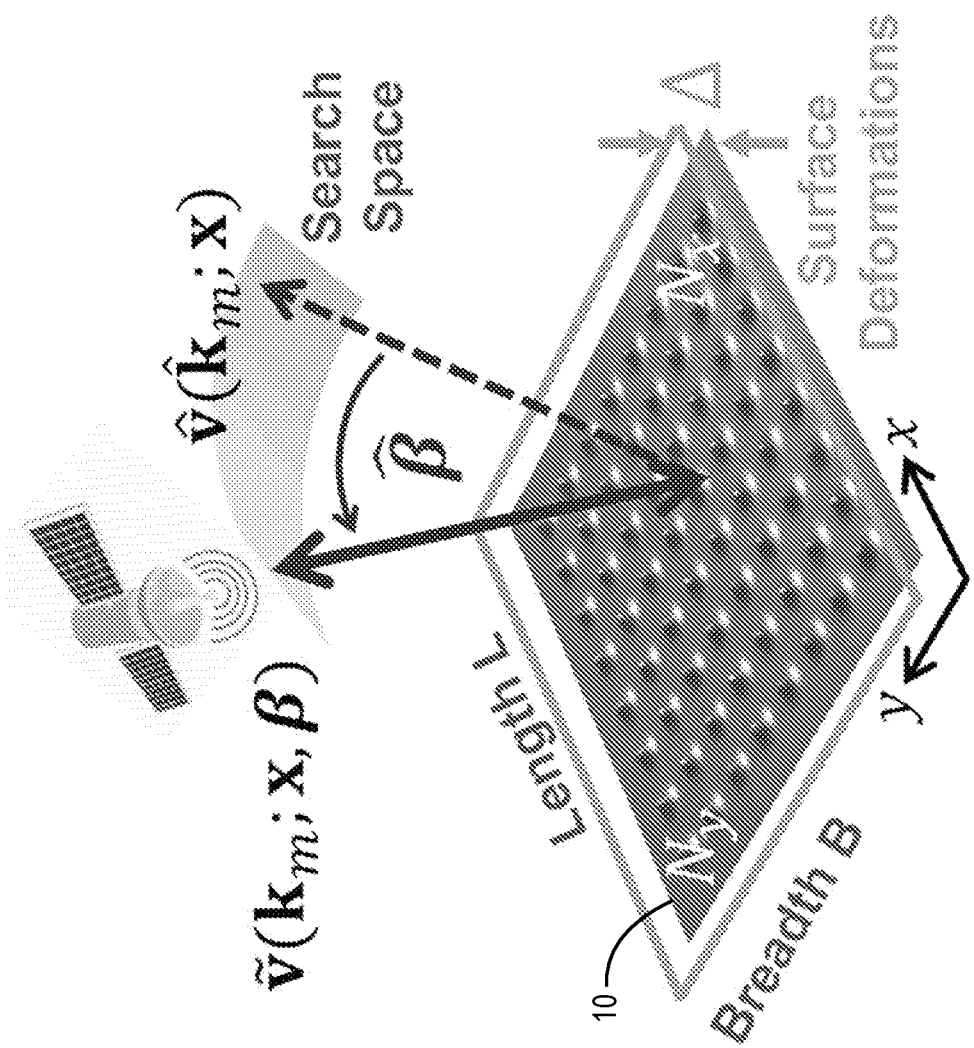
FIG. 4 is a schematic diagram of matching an estimated steering vector for the multi-service antenna array to one modeled with distortions.

FIG. 4 is a schematic diagram of matching an estimated steering vector for the multi-service antenna array 10 to one modeled with distortions. To re-calibrate the antenna array 10, the estimated steering vector $\hat{V}(k(\hat{\phi}_m, \hat{\theta}_m); x)$ is matched to one modeled with distortions, $\tilde{V}(k(\phi_m, \theta_m); x, \beta)$ by adjusting for the phase errors $\beta = \{\in, \Delta\}$. The loss function to minimize is Equation 13, abbreviating $k_m = k(\phi_m, \theta_m)$ $$\varepsilon(\beta) = \Sigma_{m=0}^{M} w_m \underbrace{\left(1 - \frac{\|\tilde{v}(k_m; x, \beta)^\dagger \hat{v}(\hat{k}_m; x)\|_2^2}{\|v(k_m; x)^\dagger v(k_m; x)\|_2^2}\right)}_{0 \leq \varepsilon_m(\beta) \leq 1} \quad \text{Equation 13}$$

The information obtained from each source is weighed according to its reliability through $w_m$. It is evident that the loss $\in(\beta)$ relies on the precision in estimating direction of arrival from each of the source $S_m$, $(\sigma_{\hat{\phi}_m}, \sigma_{\hat{\theta}_m})$, which in turn is a function of signal-to-noise ratio (SNR) of the received signal $s_m(t)$. The SNRs dictate the reliability weights $0 \leq w_m \leq 1$. The normalizing factor $\|v(k_m; x)+v(k_m; x)\|_2 = N$ ensures that the aggregate loss is independent of number of antennae in the array and guarantees $0 \leq \varepsilon_m(\beta) \leq 1$.

B. Gradient Descent Method

Incidentally, minimizing $\varepsilon(\beta)$ is a convex optimization problem, which has a global minimum at which the loss function is minimized.

$$\hat{\beta} = \mathrm{argmin}_\beta - \Sigma_{m=0}^{M} \frac{w_m}{N^2} \quad \text{Equation 14}$$

The optimization problem, Equation 14, can be solved using numerical search methods. Gradient Descent is an iterative optimization algorithm that relies on first order metrics to conduct a search for local minima of a function. At every iteration p, a step in the direction of negative gradient $\nabla \varepsilon(\hat{\beta})|_{\hat{\beta}=\beta_p}$ is taken to approach a local minimum. This method relies on an assumption that the multi-variable function $\varepsilon(\beta)$ is defined and differentiable in the neighborhood of a point $\beta_p$, an estimate at $p^{th}$ iteration. The gradient of the loss function with respect to the parameters of interest $\beta$ is, $$\nabla_\varepsilon(\hat{\beta})|_{\hat{\beta}=\beta_p} = \begin{bmatrix} \left(\frac{\partial}{\partial \epsilon_0}\varepsilon(\beta), \ldots, \frac{\partial}{\partial \epsilon_{(N-1)}}\varepsilon(\beta)\right)^T, \\ \left(\frac{\partial}{\partial \Delta_0}\varepsilon(\beta), \ldots, \frac{\partial}{\partial \Delta_{(N-1)}}\varepsilon(\beta)\right)^T \end{bmatrix} \quad \text{Equation 15}$$

For the sake of brevity, $\tilde{v} = \tilde{V}(k_m; x, \beta)$, $\hat{v} = \hat{V}(k_m; x)$ and subscript n indicates $n^{th}$ element in the steering vector array. The partial derivatives in Equation 15 are $$\frac{\partial}{\partial \epsilon_n}\varepsilon(\beta) = \sum_{m=0}^{M} \frac{2w_m}{N^2} imag\{(\tilde{v}^\dagger \hat{v})(\overline{v_n}\hat{v}_n)\} \quad \text{Equation 16}$$

$$\frac{\partial}{\partial \Delta_n}\varepsilon(\beta) = \sum_{m=0}^{M} \frac{2w_m}{N^2} nk\Omega imag\{(\tilde{v}^\dagger \hat{v})(\overline{v_n}\hat{v}_n)\} \quad \text{Equation 17}$$

where imag(·) is the imaginary part of the argument. When derived explicitly for uniform linear array $\Omega=\sin(\phi)$ and $\Omega=\sin(\theta)\cos(\phi) N_x + \sin(\theta)\sin(\phi) N_y$ for planar arrays with $N_x$ and $N_y$, number of antennae in x, y directions and $N=N_x \times N_y$ (see FIG. 4).

C. Source Sufficiency Discussion

The cardinality of phase errors $|\beta|$ that need to be accounted for relies on modality of non-linear correlated errors $\Delta$. This in turn determines number of necessary external sources to undertake the calibration algorithm. Consider a radial change $r=r_o+\partial r$ in fuselage of an aircraft, $r_0$ is the undistorted radius and $\partial r$ is the radial change due to surface deformation. Consequently, locations of the conforming antennae elements change in three-dimensional space, but the deformations can be sufficiently represented by a single parameter $\partial r$. Therefore, modality of the correlated mismatches is one and at least one external source is necessary to estimate the phase errors, in addition to the in-situ source.

V. Simulation Results

To demonstrate the workings of the hybrid in-situ and SoOP calibration method, a uniform linear array (ULA) with 8 antennae is simulated, and the aforementioned mismatch errors are introduced. The linear array is modeled as a spring being tugged on one end and it deforms uniformly along its length, hence the deformation errors are related as $\Delta_i=\Delta_j=\Delta$, $\forall (i,j) \in [0, (N-1)]$ where $\Delta$ is the spring constant and for the current scenario is set to $\lambda/5$. Random phase errors $\epsilon_{(0,\ldots,(N-1))} \sim \mathcal{N}(0, 0.5^2)$ are modeled to be drawn from a zero mean Gaussian normal distribution.

Figure 5:
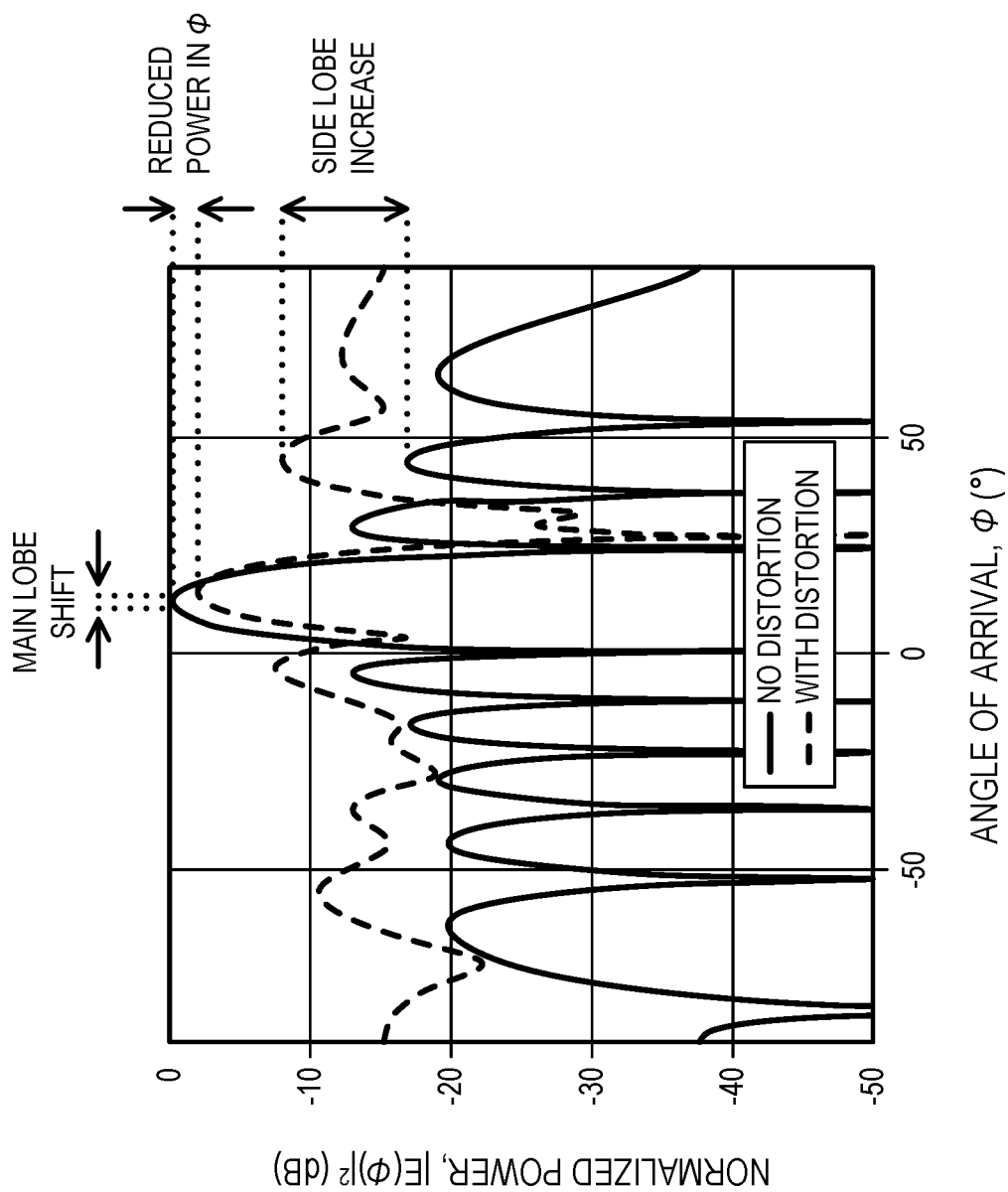
FIG. 5 is a graphical representation of the impact of phase distortions on beampattern of an embodiment of the multi-service antenna array.

FIG. 5 is a graphical representation of the impact of phase distortions on a beampattern of an embodiment of the multi-service antenna array. FIG. 5 portrays the aggregate impact of cable length mismatch, phase center location error and surface deformation on a beampattern steered to a 12° angle of arrival. The mismatch errors introduce phase distortions that manifest as a shift in main lobe by 3°, an increase in side lobes by 15 dB and a reduction of the beam power in the direction of interest by 5 dB.

The hybrid in-situ and SoOP calibration method is used to estimate distortions $\beta$ in Equation 14 using a gradient descent approach with the gradients delineated in Equations 16 and 17. Following the model order and source sufficiency discussion in Section V-C, the current problem formulation needs one external source $S_1$ (to estimate $\Delta$) in addition to the in-situ source $S_0$.

Figure 6:
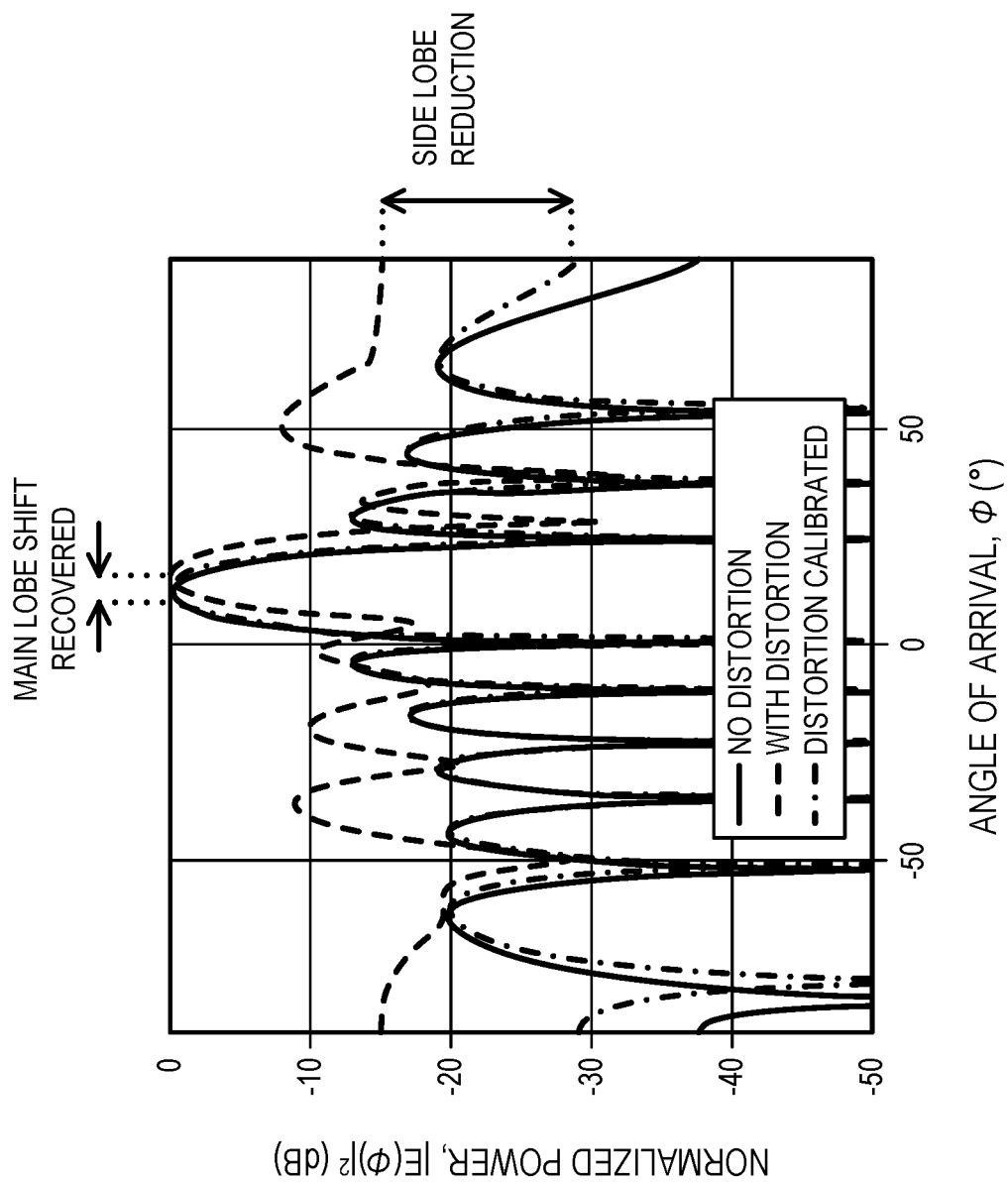
FIG. 6 is a graphical representation of the beampattern of FIG. 5 after correcting for estimations of the phase distortions via the hybrid in-situ and SoOP calibration method described herein.

FIG. 6 is a graphical representation of the beampattern of FIG. 5 after correcting for estimations of the phase distortions via the hybrid in-situ and SoOP calibration method described herein. The proposed algorithm demonstrates reduction of side lobes by 13 dB and correction of directivity to within 0.5 of true steering direction. It is apparent from the plot that this approach corrects for the pointing errors and the side lobe level drastically. The degree of improvement, however, relies on precision in estimating direction of arrival of the calibration sources $S_m$.

VI. Method for Calibration of an Antenna Array

Figure 7:
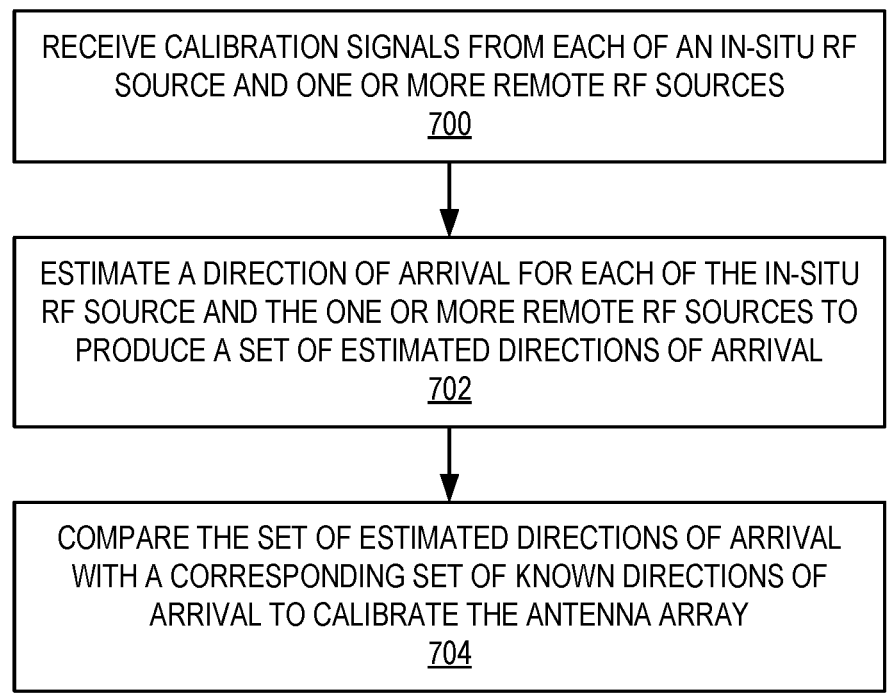
FIG. 7 is a flow diagram of a process for calibration of an antenna array for a conformal multi-service antenna array.

FIG. 7 is a flow diagram illustrating a process for calibration of an antenna array for a conformal multi-service antenna array. The process begins at operation 700, with receiving calibration signals from each of an in-situ RF source and one or more remote RF sources. The process continues at operation 702, with estimating a direction of arrival for each of the in-situ RF source and the one or more remote RF sources to produce a set of estimated directions of arrival. The process continues at operation 704, with comparing the set of estimated directions of arrival with a corresponding set of known directions of arrival to calibrate the antenna array. For the in-situ source, the direction may be known by being set during installation and/or through an initial calibration. For each remote RF source, the direction of the RF source may be known through a database (e.g., for satellites) and/or may be carried on a received signal from the corresponding remote RF source.

Figure 8:
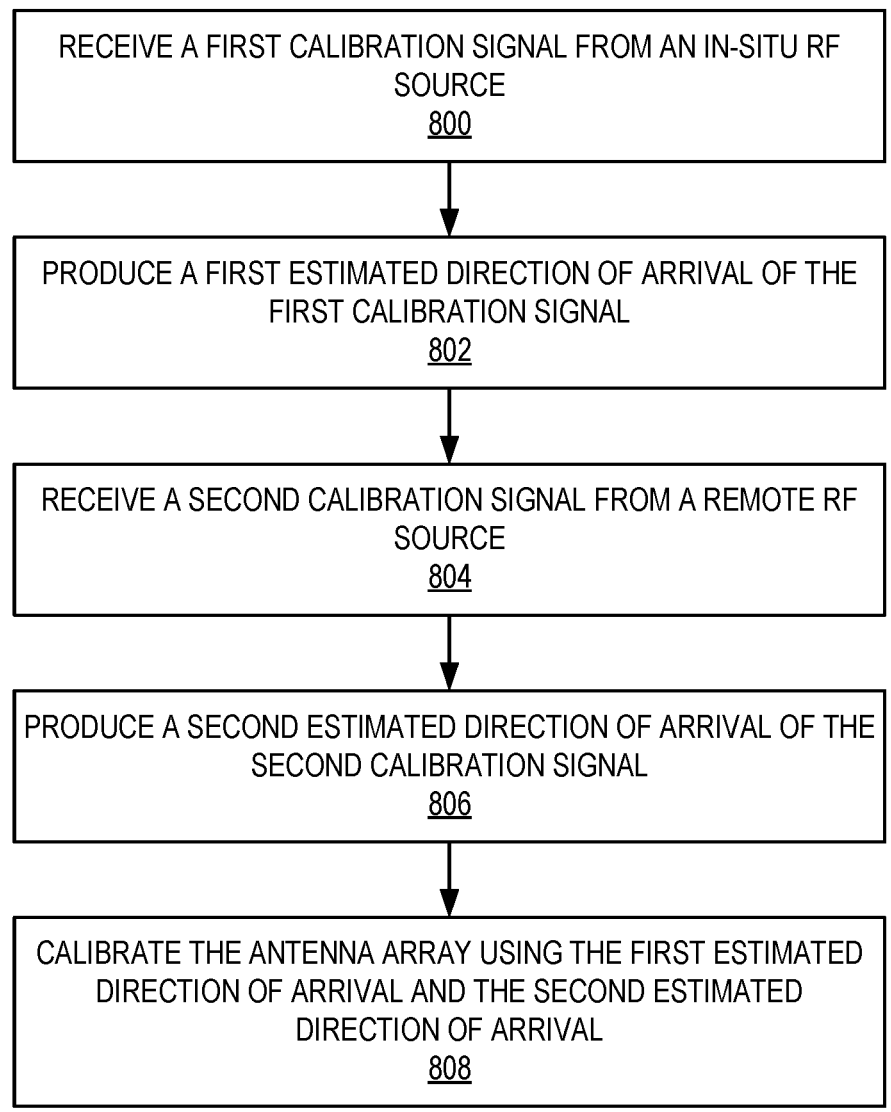
FIG. 8 is a flow diagram of a process for calibration of an antenna array for a conformal multi-service antenna array.

FIG. 8 is a flow diagram illustrating a process for calibration of an antenna array for a conformal multi-service antenna array. The process begins at operation 800, with receiving a first calibration signal from an in-situ RF source. The process continues at operation 802, with producing a first estimated direction of arrival of the first calibration signal. The process continues at operation 804, with receiving a second calibration signal from a remote RF source. The process continues at operation 806, with producing a second estimated direction of arrival of the second calibration signal. The process continues at operation 808, with calibrating the antenna array using the first estimated direction of arrival and the second estimated direction of arrival.

Although the operations of FIGS. 7 and 8 are illustrated in a series, this is for illustrative purposes and the operations are not necessarily order dependent. Some operations may be performed in a different order than that presented. Further, processes within the scope of this disclosure may include fewer or more steps than those illustrated in FIGS. 7 and 8.

VII. Computer System

Figure 9:
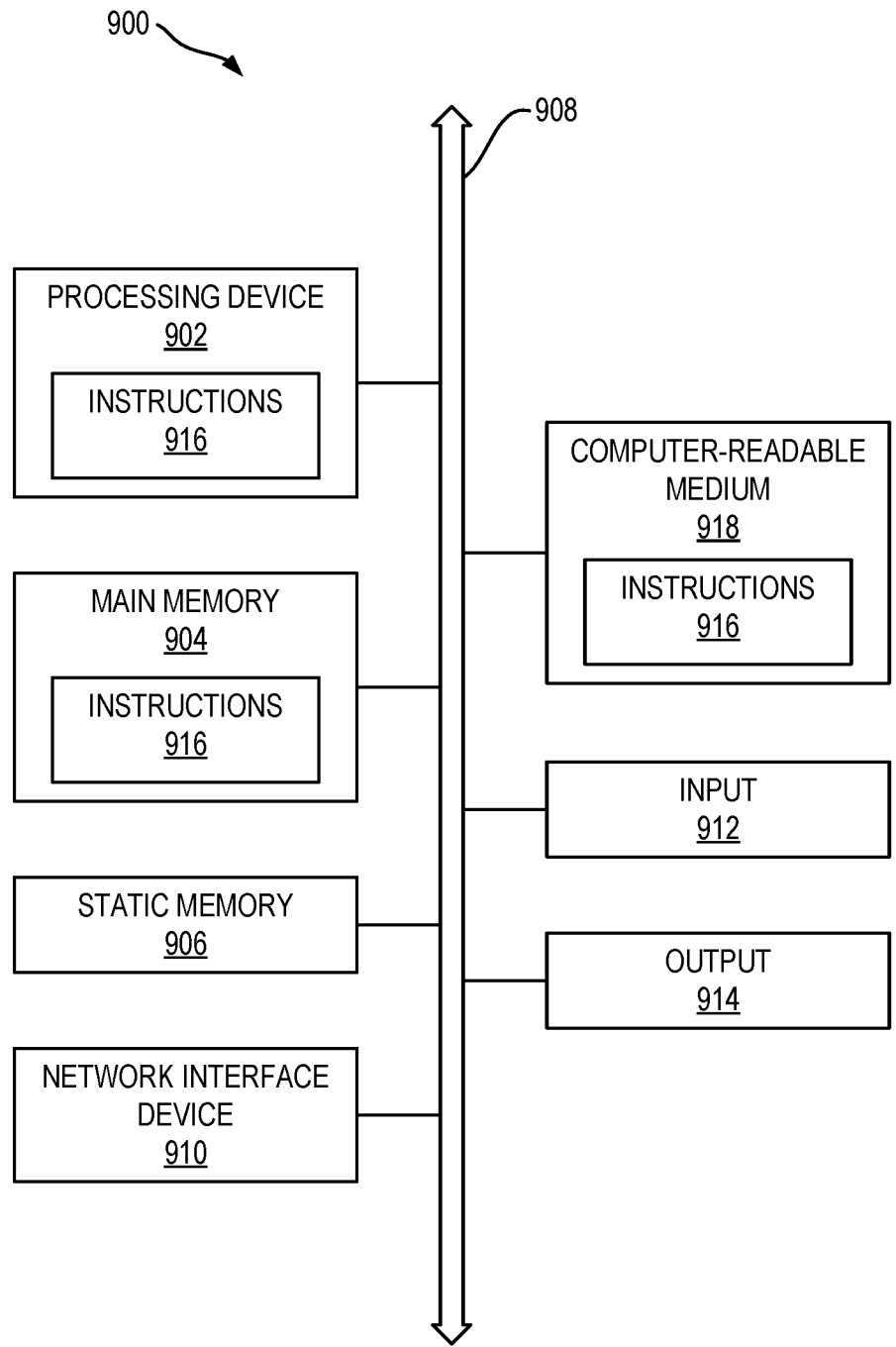
FIG. 9 is a schematic diagram of a generalized representation of an exemplary computer system that could be used to perform any of the methods or functions described above, such as calibration of an antenna array for a conformal multi-service antenna array.

FIG. 9 is a schematic diagram of a generalized representation of an exemplary computer system 900 that could be used to perform any of the methods or functions described above, such as calibration of a conformal multi-service antenna array. In this regard, the computer system 900 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer. The computer system 900 may be or include the RF device 12 of FIG. 1, which includes the antenna array 10.

The exemplary computer system 900 in this embodiment includes a processing device 902 or processor, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processing device 902 may be connected to the main memory 904 and/or static memory 906 directly or via some other connectivity means. In an exemplary aspect, the processing device 902 could be used to perform any of the methods or functions described above.

The processing device 902 represents one or more general-purpose processing devices, such as a microprocessor, central processing unit (CPU), or the like. More particularly, the processing device 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 902 is configured to execute processing logic in instructions for performing the operations and steps discussed herein.

The various illustrative logical blocks, modules, and circuits described in connection with the embodiments disclosed herein may be implemented or performed with the processing device 902, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 902 may be a microprocessor, or may be any conventional processor, controller, microcontroller, or state machine. The processing device 902 may also be implemented as a combination of computing devices (e.g., a combination of a DSP and a microprocessor, a plurality of microprocessors, one or more microprocessors in conjunction with a DSP core, or any other such configuration).

The computer system 900 may further include a network interface device 910. The computer system 900 also may or may not include an input 912, configured to receive input and selections to be communicated to the computer system 900 when executing instructions. The input 912 may include, but not be limited to, a touch sensor (e.g., a touch display), an alphanumeric input device (e.g., a keyboard), and/or a cursor control device (e.g., a mouse). The computer system 900 also may or may not include an output 914, including but not limited to a display, a video display unit (e.g., a liquid crystal display (LCD) or a cathode ray tube (CRT)), or a printer. In some examples, some or all inputs 912 and outputs 914 may be combination input/output devices.

The computer system 900 may or may not include a data storage device that includes instructions 916 stored in a computer-readable medium 918. The instructions 916 may also reside, completely or at least partially, within the main memory 904 and/or within the processing device 902 during execution thereof by the computer system 900, the main memory 904, and the processing device 902 also constituting computer-readable medium. The instructions 916 may further be transmitted or received via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions 916. The term "computer-readable medium" shall also be taken to include any medium that is capable of storing, encoding, or carrying a set of instructions for execution by the processing device 902 and that causes the processing device 902 to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for calibration of an antenna array, comprising:
receiving calibration signals from each of an in-situ radio frequency (RF) source and one or more remote RF sources;
estimating a direction of arrival for each of the in-situ RF source and the one or more remote RF sources to produce a set of estimated directions of arrival; and
comparing the set of estimated directions of arrival with a corresponding set of known directions of arrival to calibrate the antenna array by determining a first estimated steering vector based on the set of estimated directions and matching the first estimated steering vector to a second estimated streeting vector modeled with distortions.

2. The method of claim 1, wherein each remote RF source is a satellite corresponding to one known direction of the set of known directions of arrival.

3. The method of claim 2, wherein the one known direction is based on a received signal corresponding to each remote RF source.

4. The method of claim 1, wherein estimating the direction of arrival for each of the in-situ RF source and the one or more remote RF sources comprises iteratively steering a main beam of the antenna array toward the corresponding one of the in-situ RF source and the one or more remote RF sources to produce a set of steering vectors that includes the first estimated steering vector.

5. The method of claim 4, wherein calibrating the antenna array further comprises adjusting for phase errors in each of the set of steering vectors.

6. The method of claim 1, wherein the in-situ RF source is coupled to an antenna mounted on a common platform with the antenna array.

7. The method of claim 6, wherein a known direction of the in-situ RF source is set by an initial calibration.

8. The method of claim 1, wherein calibrating the antenna array compensates for one or more environmental effects.

9. The method of claim 8, wherein each antenna of the antenna array is subject to the one or more environmental effects.

10. The method of claim 9, wherein the one or more environmental effects cause deformation of a surface on which the antenna array is mounted.

11. A radio frequency (RF) device, comprising:
an antenna array; and
a processing device coupled to the antenna array and configured to:
receive a first calibration signal from an in-situ RF source;
produce a first estimated direction of arrival of the first calibration signal;
receive a second calibration signal from a remote RF source;
produce a second estimated direction of arrival of the second calibration signal; and
calibrate the antenna array using the first estimated direction of arrival and the second estimated direction of arrival by determining a first estimated steering vector based on the first estimated direction of arrival and the second estimated direction of arrival, and matching the first estimated steering vector to a second estimated streeting vector modeled with distortions.

12. The RF device of claim 11, wherein:
the RF device is coupled to an aircraft; and
the in-situ RF source is coupled to a tail of the aircraft.

13. The RF device of claim 11, wherein the RF device further comprises the in-situ RF source.

14. The RF device of claim 11, wherein the antenna array is mounted to a common surface.

15. The RF device of claim 14, wherein the antenna array comprises a conformal antenna array disposed on a substrate which is mounted to the common surface.

16. The RF device of claim 11, wherein the remote RF source is a first satellite corresponding to a first known direction.

17. The RF device of claim 16, wherein the processing device is further configured to receive a third calibration signal from a second satellite corresponding to a second known direction.

18. The RF device of claim 17, wherein the processing device is further configured to:
produce a third estimated direction of arrival of the third calibration signal; and
calibrate the antenna array using the first estimated direction of arrival, the second estimated direction of arrival, and the third estimated direction of arrival.

19. The RF device of claim 11, wherein:
producing the first estimated direction of arrival comprises steering a main beam of the antenna array toward the in-situ RF source to produce the first estimated steering vector; and
producing the second estimated direction of arrival comprises steering the main beam of the antenna array toward the remote RF source to produce a third estimated steering vector.

20. The RF device of claim 19, wherein calibrating the antenna array comprises adjusting for phase errors in the first steering vector and the third estimated steering vector.

* * * * *